C. S. DEMAREST.
TESTING AND MONITORING EQUIPMENT FOR REPEATER CIRCUITS.
APPLICATION FILED DEC. 5, 1918.
1,355,898.
Patented Oct. 19, 1920.
3 SHEETS—SHEET 2.
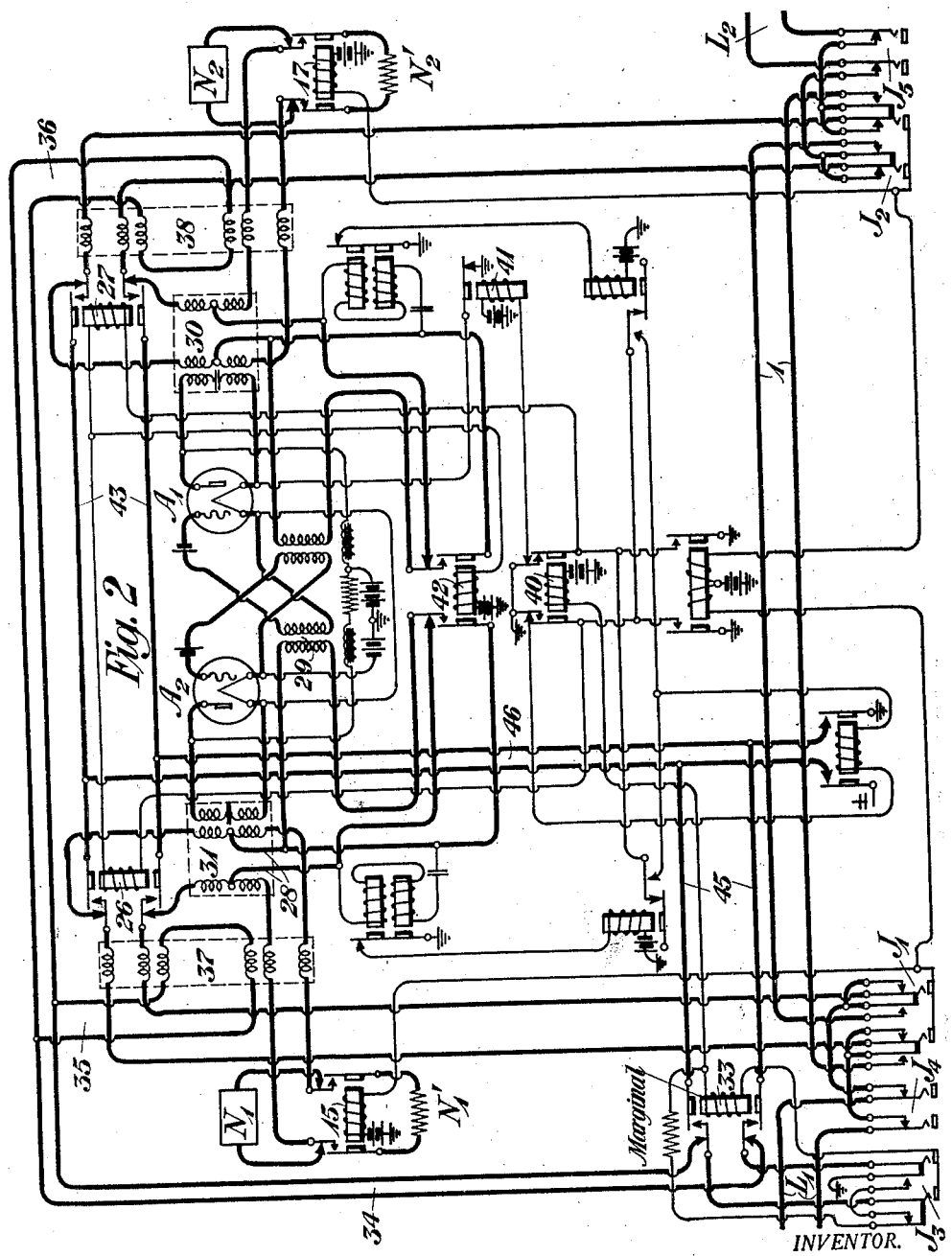
INVENTOR.
C. S. Demarest
BY G. E. Folk.
ATTORNEY

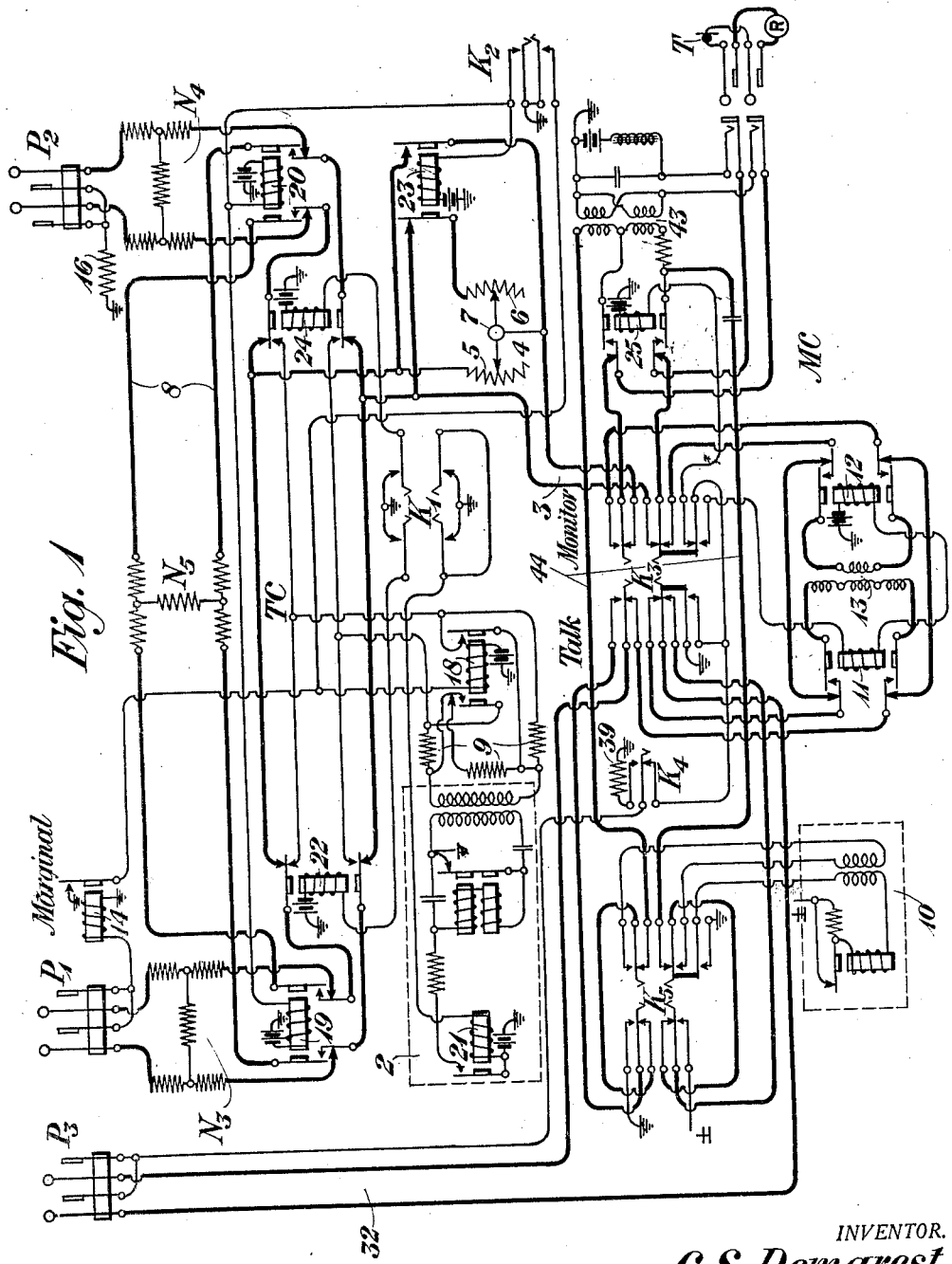

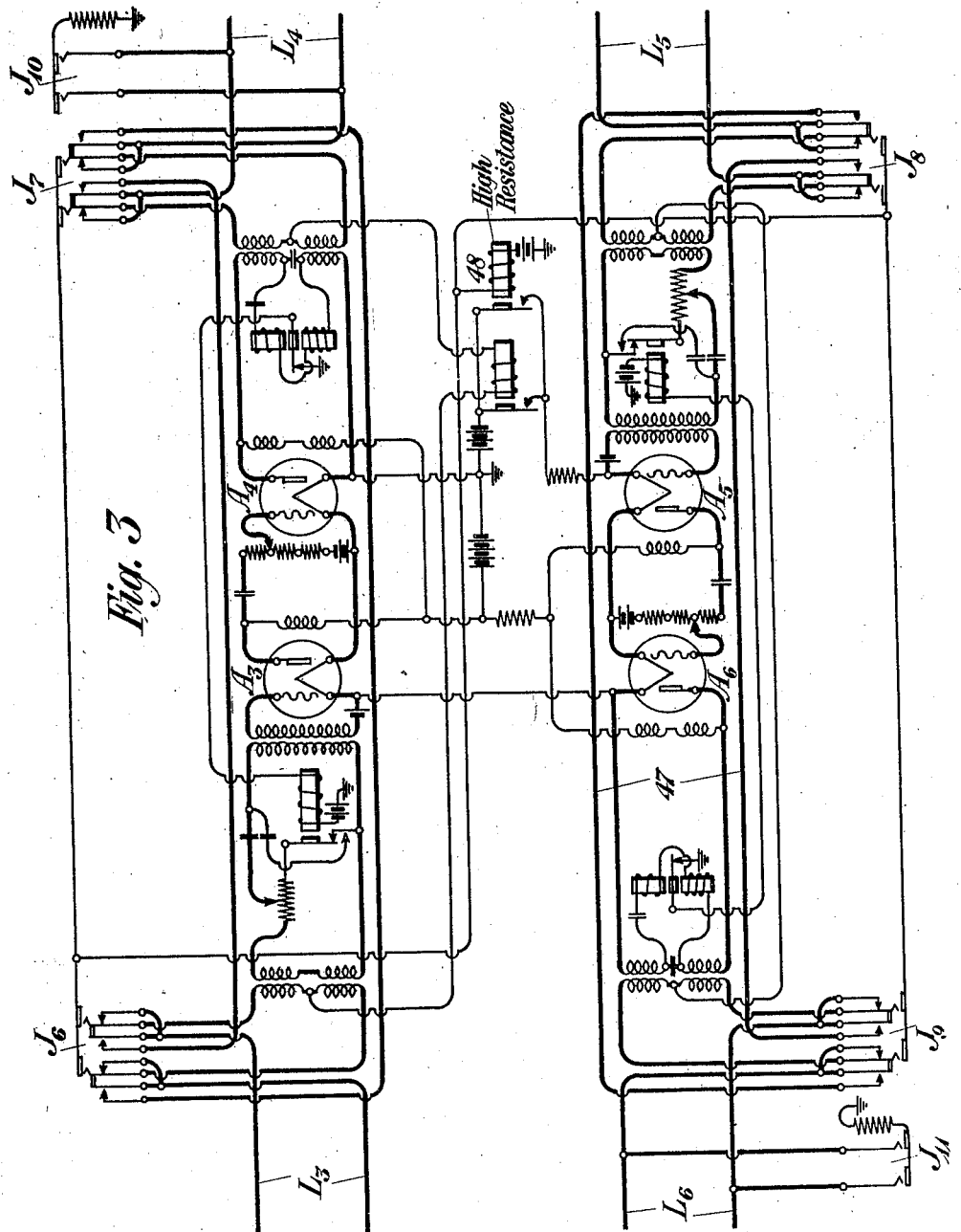

UNITED STATES PATENT OFFICE.

CHARLES S. DEMAREST, OF BROOKLYN, NEW YORK, ASSIGNOR TO AMERICAN TELEPHONE AND TELEGRAPH COMPANY, A CORPORATION OF NEW YORK.

TESTING AND MONITORING EQUIPMENT FOR REPEATER-CIRCUITS.

1,355,898.  Specification of Letters Patent.  Patented Oct. 19, 1920.

Application filed December 5, 1918. Serial No. 265,430.

*To all whom it may concern:*

Be it known that I, CHARLES S. DEMAREST, residing at Brooklyn, in the county of Kings and State of New York, have invented certain Improvements in Testing and Monitoring Equipments for Repeater-Circuits, of which the following is a specification.

This invention relates to telephone repeater circuits and more particularly to arrangements for testing and monitoring such circuits.

One of the objects of the invention is to provide a combined testing and monitoring equipment adapted to be used in connection with repeaters either of the two-way two-repeater type or of the so-called four-wire type.

In order to test the transmission of a repeater of the former type, the circuits are so arranged that when the testing circuit is connected to the repeater to be tested, the repeater is disconnected from the transmission line section. The testing circuit includes networks for simulating the transmission line section, and special balancing networks or artificial lines are associated with the repeater to balance the latter with respect to the line section simulating means. The repeater is tested by transmitting oscillations from a source associated with the testing circuit either through the repeater or through an auxiliary path to an indicating means. This necessarily involves intermittently disconnecting the repeater from the testing circuit and one of the objects of the invention is to so arrange the circuit that this may be done without disturbing the balance between the artificial line and the line section simulating means when the repeater is disconnected.

In order that the testing circuit may be used with either a two-way two-element repeater or a four-wire repeater, the former of which is provided with one stage amplifiers and the latter of which with two stage amplifiers producing a greater amplification, some means must be provided to reduce the testing current supplied to the testing circuit when a four-wire repeater is being tested, and another object of the invention has reference to the provision of means for securing this result.

A further object of the invention consists in the provision of a monitoring circuit so arranged that when used in monitoring a two-way two-element repeater the monitoring equipment is directly connected to the repeater, but when monitoring a four-wire repeater a high impedance coil is included between the monitoring apparatus and the repeater circuit, in order to prevent undue transmission losses arising from bridging the monitoring equipment across the repeater circuit.

A still further object of the invention has reference to the provision of means whereby the monitoring equipment may be associated with a transmission circuit, including a repeater, the monitoring equipment including means whereby the repeater may be connected to and disconnected from the transmission line at the will of the monitoring operator. Other and further objects of the invention will be clear from the detailed description hereinafter appearing.

The invention may now be fully understood from the following description when read in connection with the accompanying drawing, Figure 1 of which constitutes a circuit diagram of the testing and monitoring equipment, Fig. 2 of which constitutes a circuit diagram of a two-way two-element repeater of a well known type arranged for coöperation with the testing and monitoring equipment, and Fig. 3 of which constitutes a circuit diagram of the apparatus at a repeater station of a four-wire circuit, said repeater apparatus being arranged for coöperation with the testing and monitoring equipment.

Referring to Fig. 1, a testing cord circuit TC is shown terminating in twin plugs $P_1$ and $P_2$ whereby it may be connected to a repeater circuit to be tested. When the testing cord circuit is to be used in testing a two-way two-element repeater such as is illustrated in Fig. 2, the plugs $P_1$ and $P_2$ are inserted in jacks $J_1$ and $J_2$ of the repeater set. These jacks are so arranged that normally transmission line sections such as $L_1$ and $L_2$ are interconnected through the repeater. When the plugs $P_1$ and $P_2$ are inserted in the jacks, however, the line sections are disconnected from the repeater and are interconnected through an auxiliary path 1, the repeater being connected to the testing circuit. In order to simulate the line sections with which the repeater is ordinarily associated, the testing circuit is provided with networks $N_3$ and $N_4$.

The testing circuit is provided with a tone source 2 which may be connected to either end of the test circuit by means of a key $K_1$. When the key $K_1$ is thrown in one direction oscillations from the tone source are transmitted over one line section simulating network, through the repeater in one direction, and then through the other network to the receiving apparatus to be described later. When the key is thrown in the opposite direction, oscillations from the tone source are transmitted through the repeater in the opposite direction. The receiving apparatus comprises the receiver R associated with the monitoring cord circuit MC and connected to the testing cord circuit TC by the conductors 3, and a so-called receiver shunt 4 for varying the impedance of the circuit. The receiver shunt includes a series impedance element 5 and a shunt impedance element 6 which may be adjusted by means of a dial 7 to vary the transmission of the circuit without varying the impedance as viewed from the repeater.

A key $K_2$ is provided whereby the testing cord circuit TC may be disconnected from the repeater and its ends interconnected through auxiliary path 8, including a network $N_5$ which is equivalent to the networks $N_3$ and $N_4$. The key $K_2$ is also arranged to disconnect the receiver shunt 4 from the testing circuit. Upon operating the key $K_2$, oscillations are transmitted from the source 2 over the auxiliary path 8 to the receiver R. By noting the sound resulting from the oscillations thus transmitted and then releasing the key $K_2$, oscillations will be transmitted through the repeater and the receiver shunt 4 to the receiver R. By adjusting the receiver shunt until the same sound is heard in the receiver as before, the loss introduced by the receiver shunt is equal to the gain due to the repeater and by calibrating the receiver shunt in suitable units, the gain due to the repeater may be read directly. It should be noted that when the repeater is cut out and the testing circuit connected through the auxiliary path 8, the networks $N_3$ and $N_4$ still remain associated with the repeater so that the balance of the repeater is not disturbed. A network 9 is normally included between the testing circuit and the source 2. The circuit is so arranged that when the testing circuit is connected to a two-way two-element repeater, the network 9 is eliminated but when the testing circuit is connected with a four-wire repeater arranged for two stage amplification, the network will be included in the circuit so that the amplitude of the oscillations transmitted from the output of the repeater to the receiving instrument will not be too great.

The monitoring cord circuit MC terminates in a twin plug $P_3$ adapted to coöperate with corresponding jacks of the repeater with which the circuit is to be associated. When monitoring on a two-way two-element repeater circuit, such as is illustrated in Fig. 2, the plug $P_3$ may be inserted in the jack $J_3$. When monitoring on a four-wire repeater circuit, such as is shown in Fig. 3, the plug $P_3$ may be inserted in jacks such as $J_{10}$ or $J_{11}$. The monitoring cord circuit MC is provided with a key $K_3$ which, when thrown to the right, permits the operator to listen in on the repeater circuit with which the monitoring arrangement is associated. When the key $K_3$ is thrown to the left, the operator may talk over the monitoring circuit. A key $K_4$ is also provided so that when the monitoring equipment is associated with a two-way two-element repeater, the repeater may be eliminated from the transmission circuit, including the line sections, at will, to compare the transmission with the repeater in and out of the circuit. A ringing key $K_5$ is also associated with the monitoring cord circuit, said key being so arranged that when thrown to the left, low frequency ringing current is transmitted to the line into which the plug $P_3$ is inserted, while when the key is thrown to the right, ringing current of a higher frequency from source 10 is transmitted to the line. Relays 11 and 12 are also provided in connection with the monitoring equipment, these relays being arranged to control the connection of a high impedance transformer 13 to the monitoring circuit. The arrangement is such that when the monitoring equipment is associated with a two-way two-element repeater, the transformer 13 is elminated from the circuit. When the equipment is associated with a four-wire repeater, however, the transformer is included in the circuit to prevent undue transmission losses due to the inclusion of the monitoring circuit in bridge of the repeater circuit.

Further structural details will now be clear from a description of the operation of the circuit which is as follows: Assuming that it is desired to test the transmission efficiency of the two-way two-element repeater illustrated in Fig. 2, plugs $P_1$ and $P_2$ are inserted in jacks $J_1$ and $J_2$, respectively, thereby disconnecting the repeater comprising amplifiers $A_1$ and $A_2$ from the transmission line sections $L_1$ and $L_2$ and directly connecting the transmission line sections through the path 1, so that the transmission lines may be used for transmission purposes while the repeater is disconnected. The repeater is now connected over the tip contacts of the plugs and jacks to the testing cord circuit TC.

The insertion of the plug $P_1$ in the jack $J_1$ completes a circuit from the ground, through the winding of marginal relay 14, sleeve contacts of plug $P_1$ and jack $J_1$ and through the winding of relay 15 to battery. The insertion of plug $P_2$ in jack $J_2$ completes a circuit from ground through the resistance 16, over the sleeve contacts of the plug and jack and through the winding of relay 17 to battery. Relays 14, 15 and 17 are energized, the last two relays functioning to disconnect the artificial lines $N_1$ and $N_2$ from the repeater and substitute test balancing means $N_1'$ and $N_2'$. Marginal relay 14, upon being energized, completes a circuit for relay 18 which operates to open the shunt impedance and short-circuit the series impedance of the network 9 included between the source 2 and the testing circuit.

The operator may now actuate the key $K_2$, thereby completing a circuit from ground, over the upper contact of said key and in parallel through the windings of relays 19 and 20 to the battery. Relays 19 and 20 now disconnect the testing cord circuit TC from the repeater, leaving the networks $N_3$ and $N_4$ associated with the repeater in order that the balance thereof may not be disturbed. The ends of the cord circuit TC are at the same time connected through an auxiliary path 8, including a network $N_5$ equivalent to the networks $N_3$ and $N_4$. Upon throwing key $K_1$ to the left a circuit is completed for the relay 21, setting the tone source into operation, and for the relay 22 which connects the tone source to the left hand end of the cord circuit. The actuation of the key $K_2$ also resulted in the energization of the relay 23 whereby the shunt element 6 of the receiver shunt 4 is disconnected and the series element 5 is short-circuited, thereby eliminating the receiver shunt from the circuit. Oscillations are now transmitted from the tone source 2 over the front contacts of relay 22, front contacts of relay 19, through network $N^5$, over the front contacts of relay 20, back contacts of relay 24, thence over conductors 3 and the normal contacts of key $K_3$, back contacts of relay 25 to the receiver R.

The operator having first observer the sound resulting from the oscillations thus transmitted, restores the key $K_2$ permitting the $K_1$ to remain thrown to the left. Relays 19, 20 and 23 are now deënergized and oscillations are transmitted from the source 2 over the front contacts of relay 22, back contacts of relay 19, through network $N^3$, tip contacts of plug $P_1$ and jack $J_1$, back contacts of relay 26, input bridge 28 of amplifier $A^1$, through the transformer 29, amplifier $A_1$, to the three-winding transformer 30, where the current divides, half flowing through the balancing network $N_2'$ and the other half over the back contacts of the relay 27, tip contacts of jack $J_2$ and plug $P_2$, through the network $N_4$, back contacts of relay 20, back contacts of relay 24, through the receiver shunt 4, over conductors 3, normal contacts of key $K_3$, back contacts of relay 25, to the receiver R. The operator now adjusts the receiver shunt 4 until the same sound is heard in the receiver as before. Under these conditions the loss introduced by the receiver shunt is just equal to the gain due to the repeater and assuming that the receiver shunt is properly calibrated, the transmission gain of the repeater may be read directly from the setting of the instrument.

By throwing the key $K_1$ to the right, thereby energizing the relay 24 instead of 22, the transmission efficiency of the amplifier $A_2$ of the repeater may be tested by a process similar to that just described.

If the operator desires to monitor on the repeater circuit shown in Fig. 2, plugs $P_1$ and $P_2$ of the testing circuit may be withdrawn and the plug $P_3$ of the monitoring cord circuit MC may be inserted in the monitoring jack $J_3$ of the repeater. Upon throwing the key $K_3$ to the right, the receiver R is connected to the repeater over a circuit including the back contacts of relay 25, right hand make contacts of key $K_3$, back contacts of relays 12 and 11, normal left hand contacts of key $K_3$, conductors 32, tip contacts of plug $P_3$ and jack $J_3$, back contacts of marginal relay 33, conductors 34, and thence in parallel through circuits 35 and 36 which are inductively associated by means of transformers 37 and 38 with the repeater. By means of this connection the operator is able to listen in upon a telephone conversation taking place over line sections $L_1$ and $L_2$ through the repeater.

If the monitoring operator desires to compare the transmission thus obtained with the transmission resulting when the repeater is eliminated from the circuit, the key $K_4$ may be actuated, thereby completing the circuit from ground, through resistance 39, over the sleeve contacts of plug $P_3$ and jack $J_3$, through the winding of marginal relay 33 and through the winding of relay 40 to battery. Relay 33 being marginal is not actuated over this circuit but relay 40 is energized to open the circuit of the filament controlling relay 41 at its right hand contact and close parallel circuits from ground over its front contacts, through the windings of relays 26 and 27 and thence through the winding of relay 42 to battery. Relays 26, 27 and 42 are energized, the latter short-circuiting the input connections of the amplifiers $A_1$ and $A_2$ and relays 26 and 27 operating to interconnect the line sections $L_1$ and $L_2$ through the auxiliary path 43. The monitoring operator's receiver is connected to the new circuit thus established through the transformers 37 and 38 over the circuit already described and can therefore observe the character of the transmission taking place.

Should the monitoring operator desire to talk over the connection, the key $K_4$ will be restored and the key $K_3$ will be thrown to the left. A circuit will be thereby completed from ground over the left hand make contact of key $K_3$, over the lower right hand normal contact of said key, through the winding of relay 25 to battery. Relay 25 upon being energized disconnects the receiver R from its normal circuit and connects it in bridge with one winding of the induction coil 43 so that the transmitter T and receiver R are now associated with conductors 44, through induction coil 43. Another circuit is completed from ground over the lower left hand make contact of key $K_3$, over the normal contact of key $K_4$, sleeve contacts of plug $P_3$ and jack $J_3$ and through the windings of relays 33 and 40 to battery. Relays 33 and 40 are both operated, the latter functioning to render the repeater inoperative and interconnect the line sections $L_1$ and $L_2$ through conductors 43 as already described. Relay 33 disconnects the monitoring cord circuit from conductors 34 and connects it over conductors 45 to a circuit 46 leading to the auxiliary path 43. It will be now seen that the monitoring operator's talking set is connected in bridge across the circuit between line sections $L_1$ and $L_2$, so that the operator may talk over the line in either direction.

Should the monitoring operator desire to transmit ringing current over the line section $L_1$, plug $P_3$ may be withdrawn from jack $J_3$ and inserted in the jack $J_4$ and the key $K_5$ may be thrown either to the right or to the left, depending upon which character of ringing current is to be transmitted over this line section. Assuming that high frequency ringing current is to be transmitted, the key $K_5$ is thrown to the right, thereby setting the ringing generator 10 into operation. The key $K_3$ is also thrown to its left or talking position, whereupon ringing current is transmitted from the generator 10 over the right hand make contacts of key $K_5$, left hand normal contacts of said key, left hand make contacts of key $K_3$ over conductors 32, tip contacts of plug $P_3$ and jack $J_4$ to the line $L_1$. In a similar manner ringing current may be transmitted over the line $L_2$ by inserting the plug $P_3$ in the jack $J_5$ and adjusting the monitoring circuit as already described.

In order to test the transmission efficiency of the amplifiers $A_5$ and $A_6$ of the four-wire repeater shown in Fig. 3, the plugs $P_1$ and $P_2$ of the testing cord circuit TC may be inserted in the jacks $J_9$ and $J_8$. This results in disconnecting the line sections $L_5$ and $L_6$ from the amplifiers and directly connecting them through the auxiliary path 47, so that the simplex circuit employing the input and output coils of the repeater for telegraph operation will not be opened while the repeater is being tested. The amplifiers $A_5$ and $A_6$ are at the same time connected to the ends of the cord circuit TC, through the networks $N_3$ and $N_4$ which simulate the characteristics of the line sections $L_5$ and $L_6$. Upon inserting the plug $P_1$ in the jack $J_9$ a circuit is completed from ground to the winding of marginal relay 14, over the sleeve conductors of plug $P_1$ and the jack $J_9$, through the winding of high resistance relay 48 to battery. The relay 48 is of such high resistance that the marginal relay 14 is not actuated, so that the relay 18 remains deënergized and the network 9 is permitted to remain in circuit with the tone source 2. Filament controlling relay 48 is energized, however, and completes the filament circuit of the amplifiers $A_3$, $A_4$, $A_5$ and $A_6$ to render the repeater operative.

The operator may now throw key $K_1$ to the right and actuate the key $K_2$ as before. The key $K_2$ closes the circuits of relays 19, 20 and 23 to interconnect the ends of the testing cord through the auxiliary path 8 and eliminate the receiver shunt 4 from the connection in a manner similar to that described with reference to the repeater of Fig. 2. The key $K_2$ also closes a circuit over its lower make contact for the relay 18 which eliminates the network 9 from the connection so that oscillations from tone source 2 are transmitted over the front contacts of relay 24, over front contacts of relay 20, over the auxiliary path 8, front contacts of relay 19, back contacts of relay 22 and over conductors 3 to the receiver R. The operator having ascertained the volume of sound resulting from this operation restores the key $K_2$, thereby deënergizing relays 18, 19, 20 and 23. The deënergization of relay 18 again connects the network 9 in the circuit, while the deënergization of relay 23 includes the receiver shunt 4 in the circuit. Relays 19 and 20 connect the ends of the testing cord to the repeater through the networks $N_3$ and $N_4$. Oscillations are now transmitted from the source 2 through the network 9, over the make contacts of relay 24, back contacts of relay 20, network $N_4$, tip contacts of plug $P_2$ and jack $J_8$, and through the amplifiers $A_5$ and $A_6$, tip contacts of jack $J_9$ and plug $P_1$, network $N_3$, back contacts of relay 19, back contacts of relay 22, through the receiver shunt 4, over conductors 3, to the receiver R. The receiver shunt is now adjusted until the same volume of sound is received as before, indicating that the gain due to the repeater is equal to the transmission loss due to the adjusted setting of the receiver shunt, plus the known loss of the network 9. The gain due to the repeater may therefore be at once computed by adding to the indication of the receiver shunt the loss due to the network 9.

Should the operator desire to monitor on the four-wire circuit, the plugs $P_1$ and $P_2$ may be withdrawn and the plug $P_3$ of the monitoring cord circuit inserted in the jack $J_{11}$ of the four-wire circuit. Upon throwing the key $K_3$ to the right a circuit is completed from the ground over the sleeve contacts of jack $J_{11}$ and plug $P_3$, normal contact of key $K_4$ lower right hand make contact of key $K_3$ and through the windings of relays 11 and 12 to battery. Relays 11 and 12 are energized to include the high impedance transformer 13 between the receiver R and conductors 32. This is done for the purpose of preventing transmission losses due to the establishment of a bridge across the line $L_6$. The operator may now listen in on the connection through the amplifiers $A_5$ and $A_6$ to determine the character of transmission obtained. Should it be desired to compare the transmission thus obtained with that resulting when the repeater is eliminated, the repeater may be disconnected and the line sections $L_5$ and $L_6$ directly interconnected through the path 47 by inserting plugs $P_1$ and $P_2$ in the jacks $J_9$ and $J_8$.

In a similar manner transmission in the opposite direction from line section $L_3$ through amplifiers $A_3$ and $A_4$ to line section $L_4$ may be tested or monitored by inserting the plugs of the testing circuit in jacks $J_6$ and $J_7$, or inserting the plug $P_3$ of the monitoring circuit in the jack $J_{10}$. Since the operations whereby these results are secured are the same as those already described, no further description is deemed necessary.

By means of the circuit arrangements above described a simple and efficient testing and monitoring equipment is provided which is adapted for use in connection with repeaters of either the two-way two-element type or four-wire type. It will also be obvious that the general principles herein disclosed may be embodied in many other organizations widely different from those illustrated without departing from the spirit of the invention as defined in the following claims.

What is claimed is:

1. In a signaling system, transmission line sections, a repeater interconnecting said sections, a testing circuit for said repeater, a source of signaling current and indicating means associated with said testing circuit, means to disconnect said repeater from said line sections and connect it to said testing circuit, means associated with said testing circuit to simulate said line sections, an auxiliary path for the transmission of current from said source to said indicating means, and switching means whereby a circuit may be completed from said source to said indicating means either through said repeater or over said auxiliary path without disturbing the relation between said repeater and said line section simulating means.

2. In a signaling system, transmission line sections, a repeater interconnecting said sections, a testing circuit for said repeater, a source of signaling current and indicating means associated with said testing circuit, means to disconnect said repeater from said line sections and connect it to said testing circuit, means associated with said testing circuit to simulate said line sections, balancing artificial lines associated with said repeater, means responsive to the connection of said testing circuit to the repeater to associate said line section simulating means and said artificial lines with the repeater in such a manner as to balance the repeater, an auxiliary path for the transmission of current from said source to said indicating means, and switching means whereby a circuit may be completed from said source to said indicating means either through said repeater or over said signaling path without disturbing the balance of the repeater.

3. In a signaling system, repeaters of the single stage type, repeaters of the multiple stage type, a testing circuit for testing the transmission of either type of repeater, a source of current associated with said circuit, and means responsive to the association of said circuit with repeaters of different types for automatically adjusting the current supplied to said circuit from said source in accordance with the character of the repeater.

4. In a signaling system, a plurality of repeaters of different types, each type having a different amplification factor, a testing circuit for testing the transmission of said types of repeaters, a source of current associated with said circuit, and means responsive to the association of said circuit with repeaters of different types for automatically adjusting the current supplied to said circuit from said source in accordance with the character of the repeater.

5. In a signaling system, repeaters of the two-way two-repeater type, repeaters of the four-wire type, a testing circuit for testing the transmission of either type of repeater, a source of current associated with said testing circuit, an impedance varying element adapted to be included between said source and said circuit, and automatic means whereby when said circuit is connected with a repeater of the two-way two-repeater type said element will be eliminated from the circuit and when connected with a repeater of the four-wire type said element will be included in the circuit.

6. In a signaling system, repeaters of the two-way two-repeater type, repeaters of the four-wire type, a monitoring circuit adapted to be associated with repeaters of either type, a high impedance transformer associated with said monitoring circuit, and automatic means operating to include said transformer in said monitoring circuit when connected with repeaters of the four-wire type only.

7. In a signaling system, transmission line sections, a repeater interconnecting said line sections, a monitoring circuit for said repeater, a relay associated with said repeater for controlling the interconnection of said lines through an auxiliary path independent of said repeater, a marginal relay for associating the monitoring circuit with said auxiliary path, and controlling means associated with said monitoring circuit whereby both of said relays may be operated, or said first mentioned relay may be operated alone.

In testimony whereof, I have signed my name to this specification this third day of December 1918.

CHARLES S. DEMAREST.